Patented Nov. 11, 1952

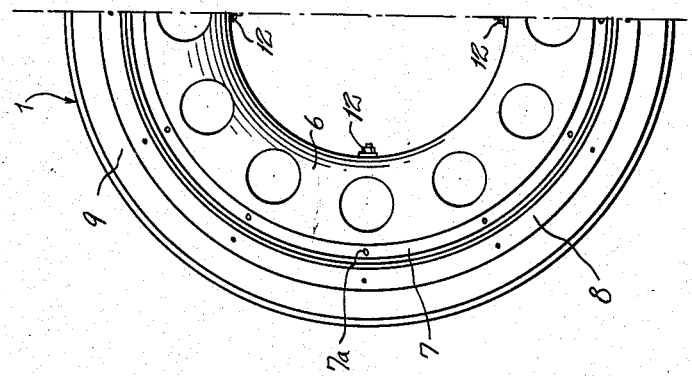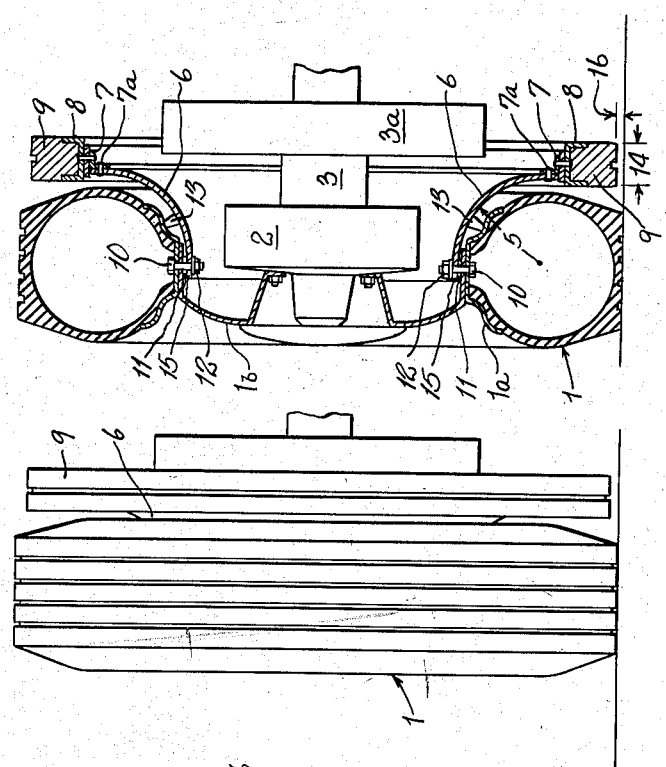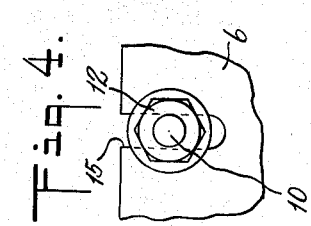

2,617,689

UNITED STATES PATENT OFFICE 2,617,689

EMERGENCY WHEEL

Andrew Anthony Oliveri, New York, N. Y.

Application April 21, 1947, Serial No. 742,858

3 Claims. (Cl. 301—39)

My invention relates to improvements in auxiliary rims for automobile wheels having pneumatic tires and is intended to relieve motorists of the discomforts and hazzards of changing wheels on automobiles when blow-outs or flat tires occur on the roadway by providing in a fixed position inside the wheel a secondary safety rim adapted to engage or contact with the ground in the event of such blowout or puncture of the pneumatic tire.

One of the objects of this invention is to provide an improved construction of auxiliary rim which is capable of being firmly mounted and supported on a conventional or standard main rim and when so mounted will have at one peripheral edge a readily releasable engagement with the main rim at the middle or felly portion thereof and preferably will also have between its peripheral edges an intermediate bearing on said main rim between said felly or middle portion and an outer edge thereof.

Another object of my invention is to provide a demountable and remountable auxiliary rim which may be readily, easily and quickly demounted from the main rim to enable a pneumatic tire, when injured and deflated, to be readily removed from the main rim for repair.

Still another object of my invention is to provide an auxiliary rim which is adapted for mounting on wheel assemblies carrying pneumatic tires which are at present in use and which may vary somewhat in profile and inner rim diameter so that adjustments may be necessary.

Another object of my invention is to provide facile and quick means for adjusting and fastening of my auxiliary rim member to the main rim.

Still another object of my invention is in an auxiliary rim of the character specified to provide at one peripheral edge thereof a peripheral flange having slots adapted to engage a series of fixed, radially-extending bolts connected at suitable predetermined points with the main rim, whereby adjustment and alignment with wheels manufactured or in use may be readily, quickly and easily accomplished.

Another object of my invention is, in combination with such a peripheral flange having a series of edge slots to employ supporting and spacing lugs adapted to provide secondary supports on the main rim.

Still another object of my invention is to provide an auxiliary rim member comprising an annular metallic plate of substantially quadrantal cross-section to conform in shape with the curvature of one side of the rim and pneumatic tire when the latter is inflated, and having at its outer peripheral edge a secondary tread composed of hard rubber and designed to engage the ground upon a slight drop in air-pressure of the pneumatic tire, said annular plate being provided at its inner peripheral edge with means for adjustably engaging a series of fixed elements on the middle or felly portion of the rim and preferably having intermediate its inner and outer peripheral edges fixed laterally-extending spacing elements contacting with the side portions of the main rim to enable equalized spacing of the body portion of said auxiliary rim plate from the side-edge surface of the main rim and tire.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is an end view of a standard automobile tire on which my improved auxiliary rim is mounted;

Fig. 2 is a cross-section through said standard automobile tire having my auxiliary rim mounted thereon;

Fig. 3 is a fragmentary view showing in elevation a semi-circular part of my auxiliary rim and tread mounted on a similar part of the main rim and tire, said two rims being removed from the hub; and Fig. 4 is a view in plan of a fragmentary portion of the inner peripheral edge of my auxiliary rim showing a slot in said edge engaged with a bolt extending therethrough from the main rim.

Referring now to these drawings which illustrate a preferred embodiment of my invention applied to a conventional automobile wheel construction comprising a tire 1 having a rim 1a and disc 1b shown in connection with the conventional brake drum 2, axle 3 and springs etc. 3a, I provide an auxiliary rim constructed to a radius 5 of substantially quadrantal shape and comprising an annular metal plate 6 of suitable thickness and strength, said plate having its inner peripheral edge of lesser diameter than the diameter of the main rim at the middle or felly portion of a standard automobile wheel provided with a pneumatic tire, said plate 6 preferably being provided circumferentially with suitable perforations to reduce its weight as more particularly indicated in Fig. 3.

In the preferred embodiment of my invention shown, the outer peripheral edge of each plate 6 is provided with annular steel angle iron 7 preferably connected to the plate 6 by rivets 7a and this steel angle iron 7 has securely mounted thereon an annular steel channel iron 8 which is provided with an annular hard rubber tread 9, said assembly of plate, angle iron, channel iron and tread comprising an annular member having an outer total diameter which is slightly less than the outer total diameter of the inflated tire on the main rim or wheel that it is to serve, and in the preferred embodiment of my invention, the road contacting portion of my tread of my auxiliary rim will be approximately three-eighths or one-half inch above the ground when in operating position as shown at 16 in Fig. 2 with the tire on the main wheel fully inflated, and the width of the tread 14 will be approximately two inches.

The inner peripheral edge of the plate 6 fits over the said felly portion of the main rim and is provided with slots 15 which are cut at the quarter points of the circumference to receive bolts which may be three-eighths or one-half inch in diameter, and I also preferably provide steel lugs as shown at 13 at quarter points of said circumference for the purpose of maintaining the parts of the auxiliary rim at an equal distance from the main rim.

In the preferred form of my invention, I provide in the middle or felly portion of the main rim of the standard automobile wheel at each of the quarter points of the circumference thereof a hole which will enable said threaded bolts 10 to be pushed through said rim with the head of the bolts positioned adjacent to the inner surface within the hollow felly portion of the rim and extending toward the periphery of the wheel, and in said preferred embodiment of my invention I weld these bolts to said inner surface portion of the rim in fixed positions and cover said heads of these bolts with rubber linings to keep the same from damaging the inflated tube of the pneumatic tire mounted on said main rim.

In mounting my auxiliary rim on the main tire and rim, I slide or insert the auxiliary rim assembly hereinabove described inwardly on the main rim to cause the slots to engage over the bolts. When so applied the lugs 13 will engage the side portions of the main rim and will retain the parts of the auxiliary rim in equidistant relationship from the main rim and also equidistant from the central vertical axis of the wheel. I thereupon apply necessary washers 11 and then tighten the nuts 12 of the bolts 10 into firm contact with the edges of the slots to procure a secure mounting of my said fixed auxiliary rim on said main rim.

The auxiliary rim may be left in attached or fixed position on each of the four automobile wheels so that automatic use is assured whenever a blow-out or any release of the air in the main tire requires the support of the auxiliary rim.

Having described my invention, I claim:

1. In an emergency wheel, an auxiliary rim for an automobile wheel having a pneumatic-tire mounted on a pneumatic-tire-mounting rim comprising an axially-aligned annular metallic plate of substantially quadrantal cross-section and having an inner peripheral edge of lesser diameter than the diameter of the felly portion of the pneumatic-tire-mounting rim and an outer edge portion of lesser diameter than an inflated tire mounted on said pneumatic-tire-mounting rim, said annular plate being provided at its outer peripheral edge with a rubber tread, said inner peripheral edge being movable to extend over said felly portion and having a series of transversely-disposed slots adapted to releasably engage fixed bolts at the middle of the felly portion of said pneumatic-tire-mounting rim.

2. In an emergency wheel, an auxiliary rim for an automobile wheel having a pneumatic-tire mounted on a pneumatic-tire-mounting rim as claimed in claim 1 in which said annular plate has a series of lugs each spaced circumferentially from the other and projecting from a portion of said plate between its edges, said lugs being adapted to engage a side surface portion of the pneumatic-tire-mounting rim to support and space the said annular metallic plate therefrom.

3. In an emergency wheel, an auxiliary rim for an automobile wheel having a pneumatic-tire mounted on a pneumatic-tire-mounting rim, comprising an axially-aligned annular member having an inner peripheral edge of lesser diameter than the diameter of the felly portion of the pneumatic-tire-mounting rim and an outer peripheral edge portion of lesser diameter than an inflated tire mounted on said pneumatic-tire-mounting rim, said axially-aligned annular member being provided at its outer peripheral edge with a tire-tread and said inner peripheral edge being movable to extend over said felly portion of said pneumatic-tire-mounting rim and having means for fastening said edge thereto comprising transversely disposed slots adapted to engage bolts mounted on the felly portion of the main rim, and lugs projecting from said annular member at a position between its edges and adapted to engage a side surface portion of the pneumatic-tire-mounting rim to support and laterally space the axially-aligned annular member in equidistant relationship from said rim.

ANDREW ANTHONY OLIVERI.

REFERENCES CITED

The following references are of record in the file of this patent:

UNITED STATES PATENTS

| Number | Name | Date |
| --- | --- | --- |
| 1,766,393 | Metts | June 24, 1930 |
| 1,992,078 | Ludwick | Feb. 19, 1935 |
| 2,110,929 | DePalma | Mar. 15, 1938 |
| 2,191,392 | Huarte | Feb. 20, 1940 |
| 2,233,742 | Lowry | Mar. 4, 1941 |

FOREIGN PATENTS

| Number | Country | Date |
| --- | --- | --- |
| 249,795 | Great Britain | Apr. 1, 1926 |